(12) United States Patent
Ansari et al.

(10) Patent No.: US 10,706,109 B2
(45) Date of Patent: Jul. 7, 2020

(54) PERSONA BASED CONTENT MODIFICATION

(71) Applicant: International Business Machines Corporation, Armonk, NY (US)

(72) Inventors: Md F. Ansari, Bangalore (IN); Priyajith Chembakassery, Bangalore (IN); Sailatha Karthikeyan, Bangalore (IN); Pradeep K. Nanjundaswamy, Bangalore (IN); Dinup P. Pillai, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 14/739,027

(22) Filed: Jun. 15, 2015

(65) Prior Publication Data

US 2016/0179759 A1  Jun. 23, 2016

Related U.S. Application Data

(63) Continuation of application No. 14/580,338, filed on Dec. 23, 2014, now abandoned.

(51) Int. Cl.
*G06F 16/93* (2019.01)
*G06F 16/28* (2019.01)
(Continued)

(52) U.S. Cl.
CPC .......... *G06F 16/93* (2019.01); *G06F 16/285* (2019.01); *G06F 40/157* (2020.01); *G06F 40/242* (2020.01)

(58) Field of Classification Search
CPC ...................................................... G06F 17/28
See application file for complete search history.

(56) References Cited

U.S. PATENT DOCUMENTS 5,701,497 A * 12/1997 Yamauchi .......... H04N 1/00127
358/403
6,598,015 B1    7/2003  Peterson et al.
(Continued)

OTHER PUBLICATIONS

SuperUser Forum, "Is there a way to view a list of comments in Microsoft Word 2007?" post published Apr. 10, 2013, <URL=https://superuser.com/questions/580678/is-there-a-way-to-view-a-list-of-comments-in-microsoft-word-2007>, last accessed May 14, 2018.*
(Continued)

*Primary Examiner* — James T Tsai
(74) *Attorney, Agent, or Firm* — Stephanie L. Carusillo; Alexander G. Jochym

(57) ABSTRACT

An original document is received. The original document is any piece of information available in electronic format. A persona of a user accessing the original document is determined. At least one document category of the original document is determined. A level of expertise of the persona of the user in each document category of the at least one document category of the original document is determined. Responsive to the determination of the level of expertise of the persona of the user in each document category of the at least one document category of the original document, the original document is modified into a modified document based on predetermined modifications for the determined level of expertise of the persona of the user in each document category of the at least one document category.

12 Claims, 4 Drawing Sheets

500

|  | Degree of Relevance (Medical Student) | Degree of relevance (Doctor-Gastroenterologist) | Degree of relevance (Software Engineer) |
|---|---|---|---|
| gastric-band | f (3, 2) = H | f (3, 3) = L | f (3, 1) = H |
| sleeve gastrectomy | f (3, 2) = H | f (3, 3) = L | f (3, 1) = H |
| biliopancreatic diversion | f (3, 2) = H | f (3, 3) = L | f (3, 1) = H |
| duodenal switch | f (3, 2) = H | f (3, 3) = L | f (3, 1) = H |
| re-routing | f (2, 2) = M | f (2, 3) = L | f (2, 1) = H |
| small intestines | f (1, 2) = L | f (1, 3) = L | f (1, 1) = M |
| gastric bypass surgery | f (3, 2) = H | f (3, 3) = L | f (3, 1) = H |

| H | Indicates the need for detailed elaboration |
| M | Indicates the need for brief explanation |
| L | No elaboration needed |

With respect to category to which the document belongs:
r(k) is the relevancy factor of the keyword k
e(p) is the expertise of the person p .Degree of Relevance = f ( r(k), e(p) )

(51) Int. Cl.
*G06F 40/157* (2020.01)
*G06F 40/242* (2020.01)

(56) References Cited

U.S. PATENT DOCUMENTS

| | | | |
|---|---|---|---|
| 7,346,668 B2 | 3/2008 | Willis | |
| 8,095,870 B2 | 1/2012 | Jiang et al. | |
| 8,463,790 B1* | 6/2013 | Joshi | G06F 17/30011 |
| | | | 707/738 |
| 8,972,396 B1* | 3/2015 | Zhang | G06F 17/30864 |
| | | | 707/730 |
| 9,710,429 B1* | 7/2017 | Raghunath | G06F 17/20 |
| 2002/0042790 A1* | 4/2002 | Nagahara | G06F 17/30899 |
| 2002/0091509 A1* | 7/2002 | Zoarez | G06F 17/271 |
| | | | 704/6 |
| 2005/0004922 A1* | 1/2005 | Zernik | G06F 17/24 |
| 2011/0029300 A1 | 2/2011 | Marcu et al. | |
| 2011/0060983 A1 | 3/2011 | Cai et al. | |
| 2011/0246869 A1* | 10/2011 | Vion-Dury | G06F 17/2211 |
| | | | 715/229 |
| 2012/0117082 A1* | 5/2012 | Koperda | G06F 16/3331 |
| | | | 707/748 |
| 2013/0124354 A1* | 5/2013 | King | G06F 17/30011 |
| | | | 705/26.1 |
| 2013/0191392 A1 | 7/2013 | Kumar et al. | |
| 2014/0052540 A1* | 2/2014 | Rajaram | G06Q 30/0255 |
| | | | 705/14.66 |
| 2014/0067656 A1* | 3/2014 | Cohen Ganor | G06Q 50/01 |
| | | | 705/39 |
| 2014/0095484 A1* | 4/2014 | Kursar | G06F 17/30554 |
| | | | 707/722 |
| 2014/0173452 A1* | 6/2014 | Hoffberg | G05B 15/02 |
| | | | 715/744 |
| 2014/0257795 A1* | 9/2014 | Birnbaum | G06F 17/2765 |
| | | | 704/9 |
| 2014/0303959 A1* | 10/2014 | Orsini | G06F 17/289 |
| | | | 704/2 |
| 2015/0293997 A1* | 10/2015 | Smith | H04L 51/32 |
| | | | 707/749 |
| 2015/0309986 A1* | 10/2015 | Brav | G06F 17/277 |
| | | | 707/739 |

OTHER PUBLICATIONS

Rahul S. Dudhabaware Dept. of Computer Science & Engg, G. H. Raisoni College of Engg., Nagpur (M.S), India; Mangala S. Madankar, "Review on natural language processing tasks for text documents" 2014 IEEE International Conference on C (Year: 2014).*

Boguraev, Branimir, et al.; "Dynamic Presentation of Phrasally-Based Document Abstractions"; Proceedings of the 32nd Hawaii International Conference on System Sciences—1999.

Jones, Karen Sparck; "Automatic summarising: factors and directions"; Advances in automatic text summarisation; Ed I. Mani and M. Maybury, Cambridge MA: MIT Press; Cambridge; 1999.

Nour, Mohamed; "A Proposed Parallel Model for extracting and Translating Query Keywords for Bilingual Information Retrieval"; The Electronics Research Institute; Cairo; Egypt; Copyright 2004.

IBM; "A Method to Summarize Document Content through Citation Clips"; Publication Date: Feb. 10, 2010; IP.com Prior Art Database Technical Disclosure; IP.com No. 000193082.

U.S. Appl. No. 14/580,338, filed Dec. 23, 2014 entitled "Persona Based Content Modification".

Appendix P List of IBM Patents or Patent Applications Treated as Related.

* cited by examiner

|  | Relevancy Factor (Category: Medical) | Relevancy Factor (Category: Computer Engineering) |
|---|---|---|
| gastric-band | 3 | 0 |
| sleeve gastrectomy | 3 | 0 |
| biliopancreatic diversion | 3 | 0 |
| duodenal switch | 3 | 0 |
| re-routing | 2 | 1 |
| small intestines | 1 | 0 |
| gastric bypass surgery | 3 | 0 |
| Relevancy (Document Category) =>∑ Relevancy Factor | 18 | 1 |

Relevancy Factor:
3 indicates highest relevance for the keyword in the specified category.
1 indicates lowest relevance for the keyword in the specified category.
0 indicates no relevance for the keyword in the specified category.

FIG. 3

|  | Expertise (Medical) | Expertise (Computer Engineer) |
|---|---|---|
| Medical Student | 2 | 1 |
| Doctor - Gastroenterologist | 3 | 1 |
| Software Engineer | 1 | 3 |

Expertise:
3 indicates highest level of expertise
1 indicates lowest level of expertise

FIG. 4

|  | Degree of Relevance (Medical Student) | Degree of relevance (Doctor-Gastroenterologist) | Degree of relevance (Software Engineer) |
|---|---|---|---|
| gastric-band | f(3, 2) = H | f(3, 3) = L | f(3, 1) = H |
| sleeve gastrectomy | f(3, 2) = H | f(3, 3) = L | f(3, 1) = H |
| biliopancreatic diversion | f(3, 2) = H | f(3, 3) = L | f(3, 1) = H |
| duodenal switch | f(3, 2) = H | f(3, 3) = L | f(3, 1) = H |
| re-routing | f(2, 2) = M | f(2, 3) = L | f(2, 1) = H |
| small intestines | f(1, 2) = L | f(1, 3) = L | f(1, 1) = M |
| gastric bypass surgery | f(3, 2) = H | f(3, 3) = L | f(3, 1) = H |
| H | Indicates the need for detailed elaboration | | |
| M | Indicates the need for brief explanation | | |
| L | No elaboration needed | | |

With respect to category to which the document belongs:
$r(k)$ is the relevancy factor of the keyword $k$
$e(p)$ is the expertise of the person $p$ FIG. 5    .Degree of Relevance = $f(r(k), e(p))$

PERSONA BASED CONTENT MODIFICATION

BACKGROUND OF THE INVENTION

The present invention relates generally to the field of document presentation, and more particularly to modifying a document so the document is easier to understand by a specific user.

The content of a document is often of varying levels of complexity. Two documents on the same topic might also be of varying levels of complexity. Additionally, readers can have varying levels of education and understanding of certain content. Often, when a person reads a document, the level of education and understanding of the reader is not sufficient to grasp the complexity of the information found in the document.

SUMMARY

Embodiments of the present invention include a method, computer program product, and system for transforming a document. In one embodiment, an original document is received. The original document is any piece of information available in electronic format. A persona of a user accessing the original document is determined. At least one document category of the original document is determined. A level of expertise of the persona of the user in each document category of the at least one document category of the original document is determined. Responsive to the determination of the level of expertise of the persona of the user in each document category of the at least one document category of the original document, the original document is modified into a modified document based on predetermined modifications for the determined level of expertise of the persona of the user in each document category of the at least one document category.

BRIEF DESCRIPTION OF THE DRAWINGS

FIG. 3 is an example of words or phrases and their relevancy factor to different categories of expertise, in accordance with an embodiment of the present invention;

FIG. 4 is an example of personas and their level of expertise in different document categories, in accordance with an embodiment of the present invention;

FIG. 5 is an example of the degree of relevance with respect to the category to which the document belongs using the relevancy factor of the key word and the expertise of the person, in accordance with an embodiment of the present invention.

DETAILED DESCRIPTION

Embodiments of the present invention allow for the transformation of a document. A document is any piece of information available in electronic format. Transformation program receives a document to be transformed. The persona of the user is determined based on user input or a combination of browsing history, social media patterns and any other information available to the transformation program. The category of the document is then determined using key words and phrases found in the document. The relevance of the document to the persona of the user is determined. The document is then transformed so as to make the document easier to understand by the user based on their persona.

Some embodiments of the present invention recognize that in this age of content and information explosion, information can be received from multiple sources but each source will have a unique style of presentation better suited for certain users. The complexity of the content of documents is relative to the user who is viewing the content in the document. The content of the document can be modified to be more suitable for a specific user based on their persona.

Figure 1:
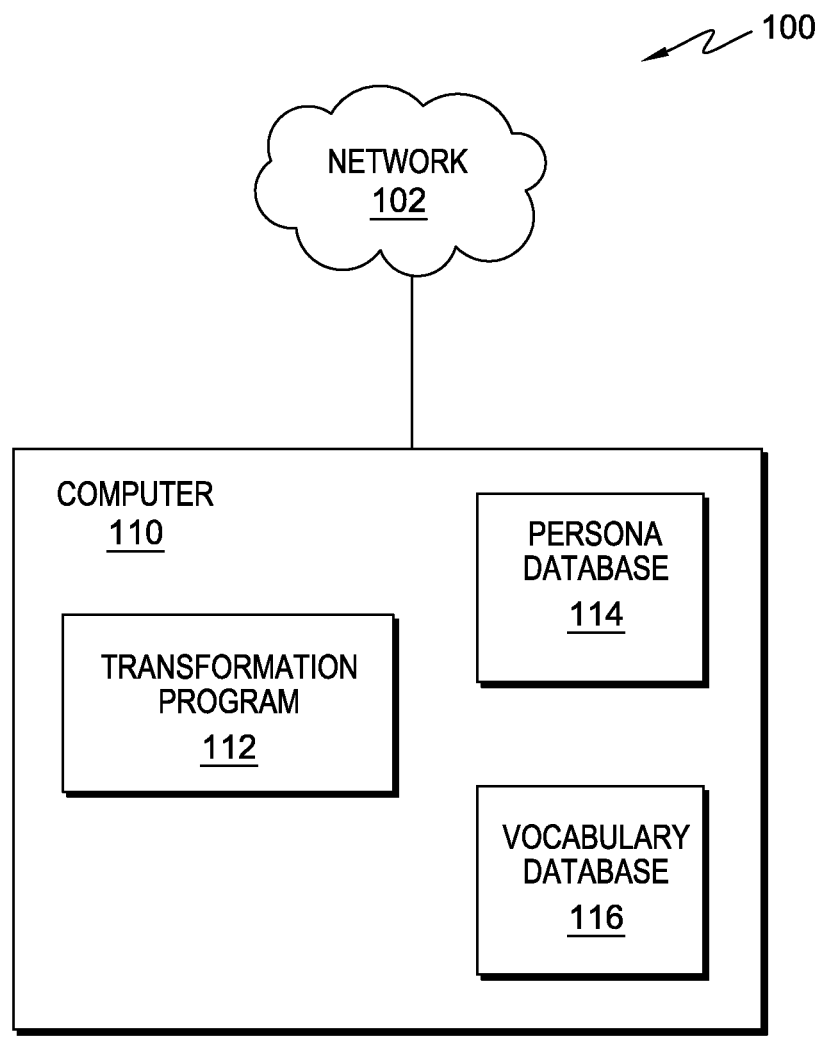
FIG. 1 is a functional block diagram of a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

An embodiment of data processing environment 100 includes computer 110, interconnected over network 102. Network 102 can be, for example, a local area network (LAN), a telecommunications network, a wide area network (WAN) such as the Internet, or any combination of the three, and include wired, wireless, or fiber optic connections. In general, network 102 can be any combination of connections and protocols that will support communications between computer 110 and any other computer connected to network 102, in accordance with embodiments of the present invention.

In example embodiments, computer 110 may be a laptop, tablet, or netbook personal computer (PC), a desktop computer, a personal digital assistant (PDA), a smart phone, or any programmable electronic device capable of communicating with any computing device within data processing environment 100. In certain embodiments, computer 110 collectively represents a computer system utilizing clustered computers and components (e.g., database server computers, application server computers, etc.) that act as a single pool of seamless resources when accessed by elements of data processing environment 100, such as in a cloud computing environment. In general, computer 110 is representative of any electronic device or combination of electronic devices capable of executing computer readable program instructions. Computer 110 may include components as depicted and described in further detail with respect to FIG. 6, in accordance with embodiments of the present invention.

Computer 110 includes transformation program 112, persona database 114, and vocabulary database 116. Transformation program 112 is a program, application, or subprogram of a larger program that transforms an original document to a version that is presented in a way easier to understand by a specific user based on their persona. Persona database 114 contains information about different personas, such as a description of the persona, personas that are similarly associated, persona categorization, and area(s) and level(s) of expertise in each of the category domains, etc. Vocabulary database 116 contains information about key words and phrases, the relevance of key words and phrases to a document category, changes or modifications that should be made to key words and phrases depending on their relevance to the document or a persona, etc.

Transformation program 112 receives an electronic document from a user. In an embodiment, the user, using a user interface discussed below, searches the internet via network 102 for a document and then indicates to transformation program 112 the document they want transformed. In an alternative embodiment, the user submits a document they already have on computer 110 directly to transformation program 112. A document may be any electronic document containing words and/or images about a subject. Transformation program 112 determines the user's persona using information submitted by the user including a profile/preferences, browsing patterns on the Internet, social media participation. Transformation program 112 determines the document category by scanning words or phrases from the document and, using vocabulary database 116, determines the category of the document (i.e., medical document, computer engineering document, etc.). Transformation program 112 determines the relevance of the words in the document to the category of the document and the user's persona. Transformation program 112 then transforms the document so that the document is shortened, lengthened, or an appendix/annotations is added to the document so that the document is easier to understand by the specific user that the document is being transformed for.

A user interface (not shown) is a program that provides an interface between a user and transformation program 112. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computer, GUIs were introduced in reaction to the perceived steep learning curve of command-line interfaces, which required commands to be typed on the keyboard. The actions in GUIs are often performed through direct manipulation of the graphics elements.

Persona database 114 and vocabulary database 116 reside on computer 110. In another embodiment, persona database 114 and vocabulary database 116 may reside on another device or computer within data processing environment 100 or any other device not within data processing environment 100, accessible via network 102. A database is an organized collection of data. Data found in a database is typically organized to model relevant aspects of reality in a way that supports processes requiring the information found in the database. Persona database 114 and vocabulary database 116 can be implemented with any type of storage device capable of storing data that may be accessed and utilized by computer 110, such as a database server, a hard disk drive, or a flash memory. In other embodiments, persona database 114 and vocabulary database 116 can be implemented with multiple storage devices within computer 110.

Alternatively, persona database 114 and vocabulary database 116 can be implemented with any computer readable storage medium as found in the art. For example, the computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Persona database 114 may include data relating to different personas, such as a description of the persona, personas that are similarly associated, persona categorization, and area(s) and level(s) of expertise in each of the category domains, etc. For example, persona database 114 may include data relating to an area of medicine, such as gastroenterology, including that gastroenterology is a branch of medicine focused on the digestive system and its disorders along with key words related to gastroenterology such as gastric-band, sleeve gastrectomy, duodenal switch, etc. Additionally, a persona has a level of expertise in a category of a document (on a scale of 1-3, where"3" indicates a highest level of expertise and "1" indicates a lowest level of expertise), for example a medical student has "2" level of expertise in the medical document category, a doctor that is a gastroenterologist has a "3" level of expertise, and a software engineer has a "1" level of expertise.

Vocabulary database 116 may include information related to key words and phrases, the relevance of key words and phrases to a document category, changes or modifications that should be made to key words and phrases depending on their relevance to the document and a persona, etc. In an embodiment, a predefined table or other conventional data organization, may be provided that includes key words and phrases and the changes or modifications that should be made for the key words and phrases depending on their relevance to the document and a persona. For example, vocabulary database 116 may include information about specific words, such as gastric-band and their relevance to a document category (on a scale of 0-3, where "3" indicates highest relevance for the key word in the specific category, "1" indicates lowest relevance for the key word in the specific category, "0" indicates no relevance for the key word) where gastric-band has a "2" relevance for a medical student, a "3" relevance for a doctor that is a gastroenterologist, and a "0" relevance for a software engineer. Additionally, vocabulary database 116 may include information about specific words, and their category of document, for example gastric-band has a "3" relevance for the medical document category and a "0" relevance for a computer engineering document category. In an embodiment, vocabulary database 116 is initially formed by supplying documents of various document categories and key words or phrases are extruded and categorized.

Figure 2:
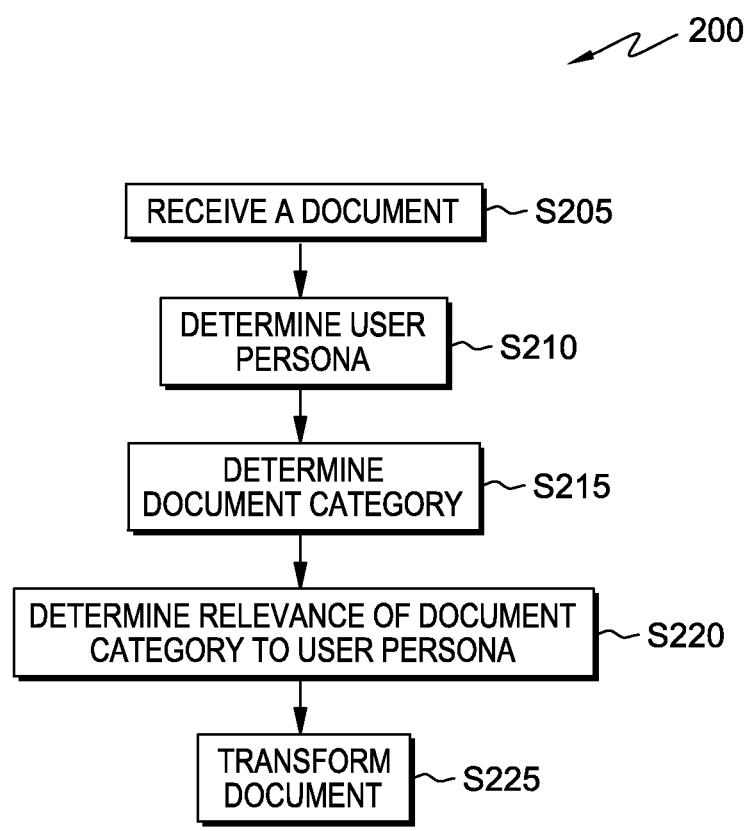
FIG. 2 is a flowchart depicting operational steps of a program for modifying content of a document, in accordance with an embodiment of the present invention.

FIG. 2 is a flowchart of workflow 200 depicting operational steps for transforming a document, in accordance with an embodiment of the present invention. In one embodiment, the steps of the workflow are performed by transformation program 112. Alternatively, steps of the workflow can be performed by any other program while working with transformation program 112. In a preferred embodiment, a user, via a user interface discussed previously, can invoke workflow 200 upon determining that they would like to transform a document. In an alternative embodiment, workflow 200 can be invoked automatically under the control of another program, for example, upon the user searching for a document and the search result being sent to transformation program 112 to begin a step in workflow 200.

Transformation program 112 receives a document to transform (step S205). A user, using user interface discussed previously, will search for a document they would like transformed. In an embodiment, the user can use a search engine connected to the internet via network 102, choose a document from the search results, and the document will be sent directly to transformation program 112. In an alternative embodiment, the user has the document located on computer 110 and will indicate to transformation program 112 the location of the document. In yet another embodiment, transformation program 112 may be an add-on to a webpage and modify the electronic text displayed to the user on the webpage.

In an example, the user downloaded a technical document about weight loss achieved by reducing the size of the stomach with a gastric-band or through removal of a portion of the stomach. The user initiates transformation program 112, locates the document, and indicates to transformation program 112 that the document is the one to be transformed. In this example, the document contains the following sentence, "Weight loss is achieved by reducing the size of the stomach with a gastric-band or through removal of a portion of the stomach (sleeve gastrectomy or biliopancreatic diversion with duodenal switch) or by resecting and re-routing the small intestines to a small stomach pouch (gastric bypass surgery)." This example sentence will be used throughout the specification, however, transformation program 112 may transform the entire document.

Transformation program 112 determines the user's persona (step S210). As discussed previously, transformation program 112 determines the user's persona using information submitted by the user including a profile/preferences, browsing patterns, social media participation, characteristics of user's based on the region they reside in, and user's previous use of vocabulary. In an embodiment, using browsing patterns and social media participation, transformation program 112 extracts words or phrases from accessed websites and participation in social media and using the extracted words or phrases, matches them with words or phrases that are associated with different personas found in persona database 114, and determines a user's persona or combination of personas. For example, the user may have visited a website for their medical college along with posting on social media about upcoming classes and exams for medical school and transformation program 112 determines that the user is a medical student. In an alternative embodiment, transformation program 112 has a list of personas from persona database 114 that the user can choose from. For example, the user may indicate that they are a medical student. In another example, the user may indicate that they are a doctor-gastroenterologist or software engineer. In yet another alternative embodiment, transformation program 112 can allow the user to choose a plurality of personas from persona database 114 that most accurately describe the user.

Transformation program 112 determines the document category (step S215). In an embodiment, transformation program 112, after receiving the document that will be transformed, uses a document parser to parse and split the document into various pieces, i.e., paragraphs, sentences, and words. Each word can be classified as one or more of the following: nominal English words including nouns, verbs, etc.; general English terms; and special key words. Special key words and their definitions will be the largest contributing factor for determining the category of the document, the relevancy to the user's persona, and how the document will be transformed. Nominal English words (nouns, verbs, etc.) are not considered. As discussed previously, the words are categorized on their relevancy to a specific category of document on a scale of 0-3, where "3" indicates highest relevance for the key word in the category of document, "1" indicates a lowest relevance for the key word in the category of document, "0" indicates no relevance for the key word in the category of the document. As shown in FIG. 3, and discussed more in depth later, the relevancy factor of the words found in the document for each document category is totaled, and the document category with the highest total is determined to be the document category of the document. In an alternative embodiment, a document may have more than one document category.

Transformation program 112 determines the relevance of the document category to the user's persona (step S220). In other words, transformation program 112 determines if the persona of the user would indicate a higher or lower level of expertise in regards to the document category. As discussed previously, the level of expertise of the user's persona is categorized based on the relevancy to a specific category of document on a scale of 1-3, where "3" indicates highest level of expertise in the category of document and "1" indicates a lowest level of expertise in the category of document. As shown in FIG. 4, and discussed more in depth later, the expertise for each persona, relative to the document category, is indicated. Transformation program 112 determines what level of expertise the user has, based on their persona determined previously, relative to the category of the document, based on the document category determined previously.

Transformation program 112 transforms the document (step S225). In an embodiment, transformation program 112 can modify the document directly, so that the user will see a new document that is different than the original document. For example, key words can have sentences that define each of the key words. Also, phrases can be removed that are too basic for a person with a higher level of expertise. In an alternative embodiment, the user will see the original document and the document has a new appendix that is also included. The appendix will provide definitions for key words and expands on the information in the document, allowing for easier readability for the user based on their persona. As shown in FIG. 5, and discussed more in depth later, the degree of relevance of each word is determined with respect to the category to which the document belongs using the relevancy factor of the key word and the expertise of the person.

FIG. 3 depicts an example of key words or phrases found in the previously discussed example sentence from the document and their relevancy factor to different categories of expertise, in accordance with an embodiment of the present invention. Table 300 shows the words found in the example sentence along with two example document categories, medical and computer engineering. The document or sentence (in this example) is categorized based on the sum of relevancy factor of key words for each category. In an embodiment, transformation program 112 will determine the document is in the category with the highest relevance. In an alternative embodiment, transformation program 112 will indicate at least two categories that are determined to be highly relevant and the user will choose which category they wish the document to be in. Table 300 indicates, using the example sentence, that the document would fall into the medical category due to its "18" relevancy rating as compared to the "1" relevancy rating of computer engineering.

FIG. 4 depicts an example of personas found, based on the key words found in the previously discussed example sentence and the level of expertise of the personas to different categories of documents, in accordance with an embodiment of the present invention. Table 400 shows the three personas from the example, medical student, doctor of gastroenterology, and software engineer, along with two example document categories, medical and computer engineering. In the example, the software has a low level of expertise in the medical category, the medical student has a medium level of expertise in the medical category, and the doctor of gastroenterology has the highest level of expertise in the medical category. The software engineer has the highest level of expertise in computer engineering and both the medical student and doctor of gastroenterology have the lowest level of expertise in computer engineering.

FIG. 5 depicts an example of the degree of relevance of the key words with respect to the category to which the document belongs using the relevancy factor of the key word and the expertise of the person, in accordance with an embodiment of the present invention. The degree of relevance is a function of relevancy factor of the key word, r(k), and the expertise of the person e(p). The letter "L" indicates no elaboration of that term or phrase is needed. The letter "M" indicates a brief explanation of that term or phrase is needed. The letter "H" indicates a detailed explanation for that term or phrase is needed. In an embodiment, transformation program 112 has the different levels of explanation (L, M, H) pre-programmed and they are updated by transformation program 112 upon responses from users on their accuracy. For example, if a user with the persona of a software engineer determined that they did not understand a key word or phrase and transformation program 112 had that word or phrase as an "L", the user could indicate to transformation program 112 that the word or phrase should be changed to an "M" or "H".

In an alternative embodiment, the degree of relevance can be determined using the following algorithm scenario. In scenario 1, if e(p), the expertise of the person, equals 3, i.e. the highest level of expertise, then the degree of relevance is Low (L) for any value of r(k), the relevancy factor of the key word. If scenario 1 is not fulfilled, then in scenario 2, if e(p) is less than r(k) then the degree of relevance is High (H). If scenario 1 and scenario 2 is not fulfilled, then in scenario 3, if e(p) equals r(k), then the degree of relevance is Medium (M). If scenario 1, scenario 2, and scenario 3 is not fulfilled then the degree of relevance is Low (L).

Table 500 shows the key words found in the example sentence along with three personas, medical student, doctor of gastroenterology, and software engineer. In this example, the document is a medical category of document from which the example sentence, discussed previously, was extracted from. The key word "re-routing" has a relevancy factor of "2" in the specified medical category (see FIG. 3). For a medical student, the expertise of the user is "2" for the medical category and therefore a medical student needs "M", a brief explanation of the term "re-routing". For a doctor of gastroenterology, the expertise of the person is "3" and therefore a doctor of gastroenterology needs "L", no elaboration of the term "re-routing". For a software engineer, the expertise of the person is "1" and therefore a software engineer needs a detailed elaboration of the term "re-routing".

As discussed previously, the following example sentence was part of the example document for the user. "Weight loss is achieved by reducing the size of the stomach with a gastric-band or through removal of a portion of the stomach (sleeve gastrectomy or biliopancreatic diversion with duodenal switch) or by resecting and re-routing the small intestines to a small stomach pouch (gastric bypass surgery)." In the example, if the user's persona is a medical student, the medical student may need a high level of elaboration of the key word "gastric-band" and the following phrase may be inserted, "commonly called a lap-band, A band, or LAGB, is an inflatable silicone device placed around the top portion of the stomach to treat obesity, intended to slow consumption of food and thus reduce the amount of food consumed." In an alternative example, if the user's persona is a doctor of gastroenterology, then they need no elaboration of the word and the word gastric-band would require no modification. In yet another alternative example, if the user's person is a software engineer, then they need a high level of elaboration of the word and the word gastric-band might have the following phrase after it, "commonly called a lap-band, A band, or LAGB, is an inflatable silicone device placed around the top portion of the stomach to treat obesity, intended to slow consumption of food and thus reduce the amount of food consumed." In an alternative embodiment, the phrases being added may be in an appendix form, as discussed previously.

Figure 6:
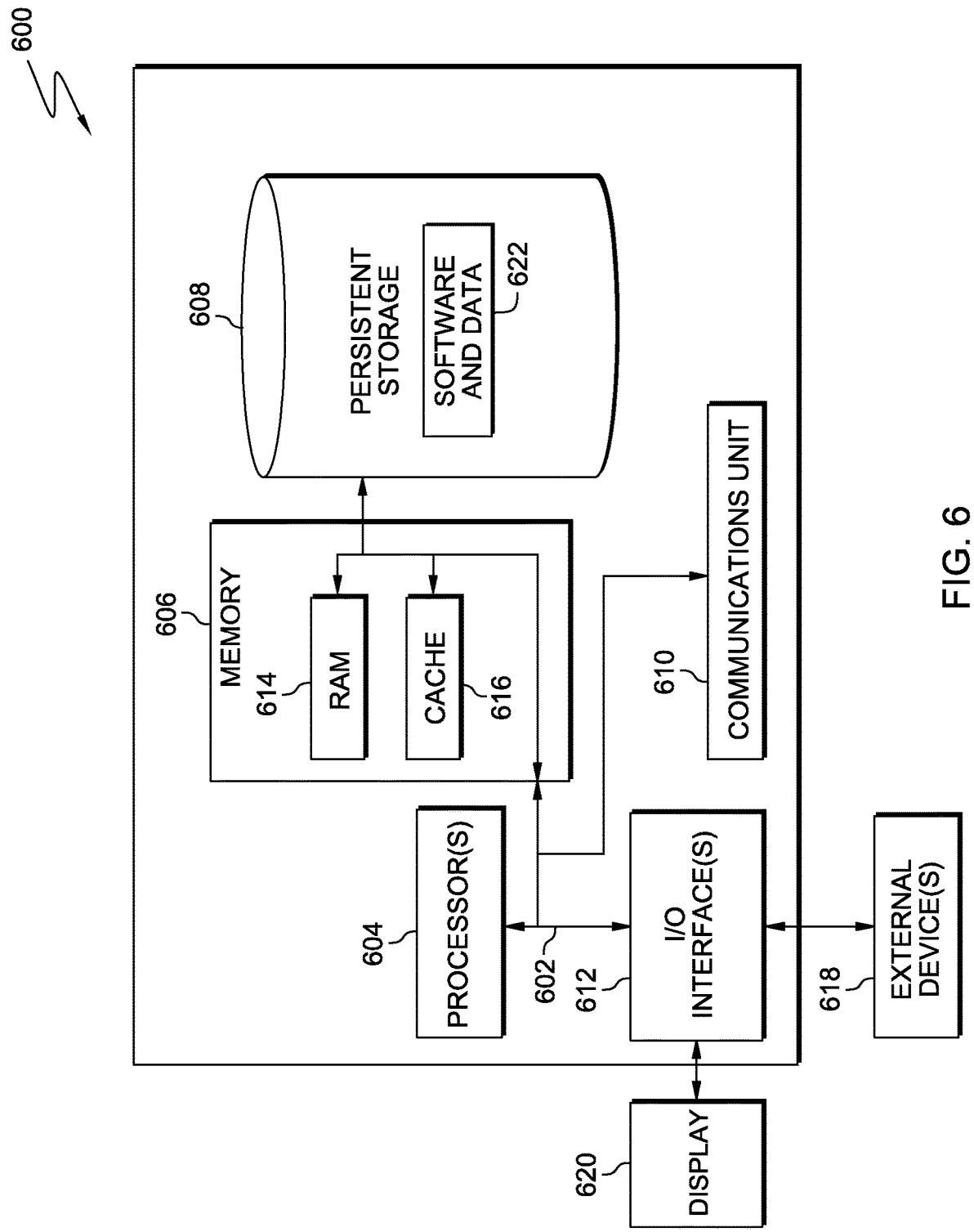
FIG. 6 depicts a block diagram of components of a computing system representative of the computer of FIG. 1, in accordance with an embodiment of the present invention.

FIG. 6 depicts a block diagram of components of computer 110, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media. Software and data 622 are stored in persistent storage 608 for access and/or execution by processors 604 via one or more memories of memory 606. With respect to computer 110, software and data 622 includes transformation program 112, persona database 114, and vocabulary database 116.

In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 may include one or more network interface cards. Communications unit 610 may provide communications through the use of either or both physical and wireless communications links. Software and data 622 may be downloaded to persistent storage 608 through communications unit 610.

I/O interface(s) 612 allows for input and output of data with other devices that may be connected to computer 600. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., transformation program 112, can be stored on such portable computer readable storage media and can be loaded onto persistent storage 608 via I/O interface(s) 612. I/O interface(s) 612 also can connect to a display 620.

Display 620 provides a mechanism to display data to a user and may be, for example, a computer monitor. Display 620 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for transforming a document, the computer program product comprising:

one or more computer readable storage medium and program instructions stored on the one or more computer readable storage medium, the program instructions comprising:

program instructions to receive an original document, wherein the original document is any piece of information available in electronic format;

program instructions to determine a persona of a user accessing the original document, wherein the persona of the user is determined using at least one of: (1) Internet browsing patterns of the user, (2) social media participation of the user, (3) a created profile of the user, and (4) a location of the user;

program instructions to scan the original document for a plurality of words;

program instructions to determine a set of key words from the plurality of words, wherein the set of key words does not include nominal English words and general English terms, and wherein the set of key words is determined based, at least in part, on a vocabulary database that includes information related to key words for each document category;

program instructions to determine a relevance score for each key word of the set of key words, wherein the relevance score of each key word is based on a relevance of each key word to each document category of a plurality of document categories;

program instructions to determine a summation relevance score for each document category of the plurality of document categories, wherein the summation relevance score is the sum of the relevance score for each key word of the plurality of key words for each document category of the plurality of document categories;

program instructions to determine a document category of the plurality of documents categories for the original document, wherein the document category determined is the document category with the highest summation relevance score;

program instructions to determine a level of expertise of the persona of the user based on a relevance of the persona of the user to the document category;

program instructions to, in response to determining the level of expertise of the persona of the user in relevant to the document category, modify the original document into a modified document, wherein each key word of the plurality of key words is modified to one of three predetermined modifications based on the relevance score and the level of expertise of the persona of the user, and wherein the three predetermined modifications include no elaboration of the key word, brief explanation for the key word, and detailed explanation of the key word; and program instructions to create an appendix within the modified document, wherein the appendix includes all the modifications to all key words in one location within the modified document.

2. The computer program product of claim 1, wherein the set of key words and a definition of each key word of the set of key words are used to determine the document category of the original document.

3. The computer program product of claim 1, wherein the program instructions to determine the level of expertise of the persona of the user based on the relevance of the persona of the user to the document category comprise:

program instructions to compare the persona of the user to a plurality of predetermined expertise values, wherein each predetermined expertise value corresponds to one document category of the plurality of document categories; and program instructions to identify the level of expertise of the persona of the user in each document category of the plurality of document categories of the original document.

4. A computer system for transforming a document, the computer system comprising:

one or more computer processors;

one or more computer readable storage medium; and program instructions stored on the computer readable storage medium for execution by at least one of the one or more processors, the program instructions comprising:

program instructions to receive an original document, wherein the original document is any piece of information available in electronic format;

program instructions to determine a persona of a user accessing the original document, wherein the persona of the user is determined using at least one of: (1) Internet browsing patterns of the user, (2) social media participation of the user, (3) a created profile of the user, and (4) a location of the user;

program instructions to scan the original document for a plurality of words;

program instructions to determine a set of key words from the plurality of words, wherein the set of key words does not include nominal English words and general English terms, and wherein the set of key words is determined based, at least in part, on a vocabulary database that includes information related to key words for each document category;

program instructions to determine a relevance score for each key word of the set of key words, wherein the relevance score of each key word is based on a relevance of each key word to each document category of a plurality of document categories;

program instructions to determine a summation relevance score for each document category of the plurality of document categories, wherein the summation relevance score is the sum of the relevance score for each key word of the plurality of key words for each document category of the plurality of document categories;

program instructions to determine a document category of the plurality of documents categories for the original document, wherein the document category determined is the document category with the highest summation relevance score;

program instructions to determine a level of expertise of the persona of the user based on a relevance of the persona of the user to the document category;

program instructions to, in response to determining the level of expertise of the persona of the user in relevant to the document category, modify the original document into a modified document, wherein each key word of the plurality of key words is modified to one of three predetermined modifications based on the relevance score and the level of expertise of the persona of the user, and wherein the three predetermined modifications include no elaboration of the key word, brief explanation for the key word, and detailed explanation of the key word; and program instructions to create an appendix within the modified document, wherein the appendix includes all the modifications to all key words in one location within the modified document.

5. The computer system of claim 4, wherein the set of key words and a definition of each key word of the set of key words are used to determine the document category of the original document.

6. The computer system of claim 4, wherein the program instructions to determine the level of expertise of the persona of the user based on the relevance of the persona of the user to the document category comprise:

program instructions to compare the persona of the user to a plurality of predetermined expertise values, wherein each predetermined expertise value corresponds to one document category of the plurality of document categories; and program instructions to identify the level of expertise of the persona of the user in each document category of the plurality of document categories of the original document.

7. The computer program product of claim 1, wherein the program instructions to determine the persona of the user further comprise:

program instructions to extract a first set of words or phrases from the at least one of (1) the Internet browsing patterns and (2) the social media participation;

program instructions to match the first set of words or phrases to a second set of words or phrases associated with a stored persona in a persona database; and program instructions to select the stored persona as the persona of the user.

8. The computer system of claim 4, wherein the program instructions to determine the persona of the user further comprise:

program instructions to extract a first set of words or phrases from the at least one of (1) the Internet browsing patterns and (2) the social media participation;

program instructions to match the first set of words or phrases to a second set of words or phrases associated with a stored persona in a persona database; and program instructions to select the stored persona as the persona of the user.

9. A method for transforming a document, the method comprising:

receiving, by one or more processors, an original document, wherein the original document is any piece of information available in electronic format;

determining, by one or more processors, a persona of a user accessing the original document, wherein the persona of the user is determined using at least one of: (1) Internet browsing patterns of the user, (2) social media participation of the user, (3) a created profile of the user, and (4) a location of the user;

scanning, by one or more processors, the original document for a plurality of words;

determining, by one or more processors, a set of key words from the plurality of words, wherein the set of key words does not include nominal English words and general English terms, and wherein the set of key words is determined based, at least in part, on a vocabulary database that includes information related to key words for each document category;

determining, by one or more processors, a relevance score for each key word of the set of key words, wherein the relevance score of each key word is based on a relevance of each key word to each document category of a plurality of document categories;

determining, by one or more processors, a summation relevance score for each document category of the plurality of document categories, wherein the summation relevance score is the sum of the relevance score for each key word of the plurality of key words for each document category of the plurality of document categories;

determining, by one or more processors, a document category of the plurality of documents categories for the original document, wherein the document category determined is the document category with the highest summation relevance score;

determining, by one or more processors, a level of expertise of the persona of the user based on a relevance of the persona of the user to the document category;

responsive to determining the level of expertise of the persona of the user in relevant to the document category, modifying, by one or more processors, the original document into a modified document, wherein each key word of the plurality of key words is modified to one of three predetermined modifications based on the relevance score and the level of expertise of the persona of the user, and wherein the three predetermined modifications include no elaboration of the key word, brief explanation for the key word, and detailed explanation of the key word; and creating, by one or more processors, an appendix within the modified document, wherein the appendix includes all the modifications to all key words in one location within the modified document.

10. The method of claim 9, wherein the set of key words and a definition of each key word of the set of key words are used to determine the document category of the original document.

11. The method of claim 9, wherein determining the level of expertise of the persona of the user based on the relevance of the persona of the user to the document category comprises:

comparing, by one or more processors, the persona of the user to a plurality of predetermined expertise values, wherein each predetermined expertise value corresponds to one document category of the plurality of document categories; and identifying, by one or more processors, the level of expertise of the persona of the user in each document category of the plurality of document categories of the original document.

12. The method of claim 9, wherein determining the persona of the user comprises:

extracting, by one or more processors, a first set of words or phrases from the at least one of (1) the Internet browsing patterns and (2) the social media participation;

matching, by one or more processors, the first set of words or phrases to a second set of words or phrases associated with a stored persona in a persona database; and selecting, by one or more processors, the stored persona as the persona of the user.

* * * * *